May 25, 1937.  C. A. BRAUN  2,081,790
TURN INDICATING SYSTEM AND APPARATUS
Filed March 9, 1936
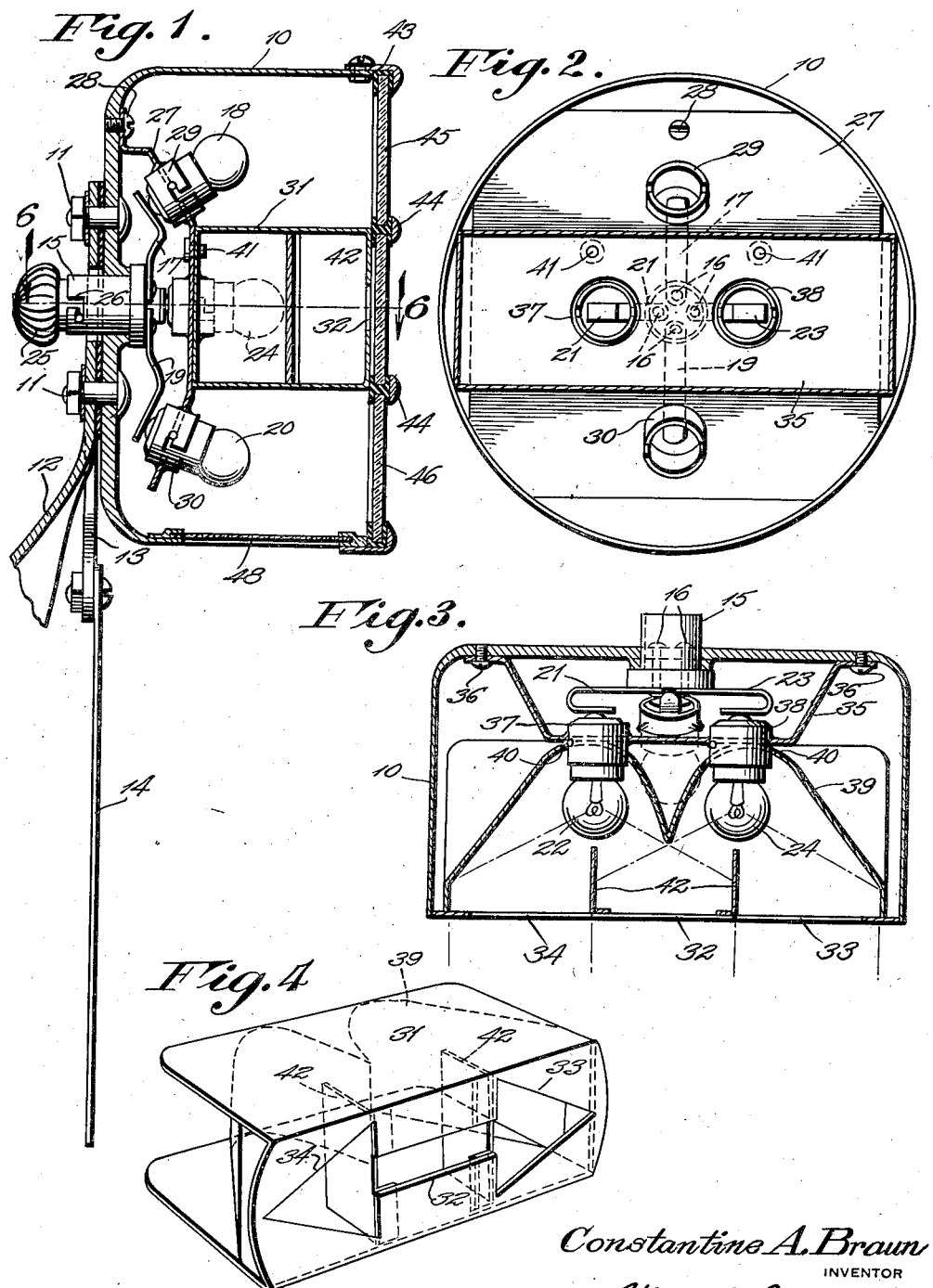
Constantine A. Braun
INVENTOR
BY Victor J. Evans & Co.
ATTORNEY
WITNESS R. E. Wise Patented May 25, 1937

2,081,790

UNITED STATES PATENT OFFICE 2,081,790

TURN INDICATING SYSTEM AND APPARATUS

Constantine A. Braun, Pottsville, Pa.

Application March 9, 1936, Serial No. 67,964

3 Claims. (Cl. 177—329)

This invention relates to turn indicating apparatus for motor vehicles.

An object of the invention is to provide a novel rear lamp construction which will combine stop, right and left signal lamps, and tail light in a single casing.

A further object is to provide a lamp construction having a central cut away portion and enlarged cut away portions at the ends of the central portion defining arrow heads, novel reflectors being provided for reflecting light rays from lamps positioned behind the enlarged portions to illuminate the central portion and either of the arrowheads selectively, thereby displaying complete arrows to indicate the intended turn.

A further object is to provide signal apparatus of this type which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a vertical sectional view of the combined stop, right and left signal lamps and tail light.

Figure 2 is a front elevation of the parts shown in Figure 1 with the lens removed.

Figure 3 is a cross sectional view taken on the line 6—6 of Figure 1.

Figure 4 is a detail perspective view of the signal box.

Referring now to the drawing in which like characters of reference designate similar parts in the various views, and more especially referring to Figure 2, it will be seen that the rear lamp casing 10 is substantially cylindrical in contour and may be bolted as shown at 11 to the conventional tail light bracket 12 of a motor vehicle, above the bracket arm 13 which supports the license plate 14.

The lamp casing is provided in the rear wall with an opening to receive a socket 15 which is provided with four conductor pins 16, one of the pins securing to the socket a resilient center contact strip 17 for a stop light 18. Another of the pins secures to the socket a resilient center contact 19 for a tail light 20. Another of the pins secures to the socket a resilient center contact strip 21 for the left turn signal lamp 22, as shown in Figure 3, and the remaining pin secures to the socket the resilient contact strip 23 of the right turn signal lamp 24.

A plug 25 which carries a cable of conductor wires for the lamps may be connected to the socket 15 by a bayonet joint, 26, as shown in Figure 1.

A plate 27 is secured to the rear wall of the lamp casing near the top thereof by a screw 28 and extends downwardly within the lamp casing to support the sockets 29 and 30 respectively of the stop and tail lights. The plate is offset so that the stop light is supported at about an angle of 45 degrees above the horizontal while the tail light is supported at about an angle of 45 degrees below the horizontal.

The signal box 31 is substantially U-shaped in contour, as best shown in Figure 4, and is preferably formed of light strong sheet metal. The front side of the U-shaped signal box is provided with a cut out central portion 32 and enlarged cut away portions 33 and 34 at the ends of the central portion defining arrowheads. The signal lamps 22 and 24 are supported in the signal box by means of a plate 35 which is secured to the back of the lamp casing by screws 36. The plate is orificed to receive the sockets 37 and 38 respectively of the left turn and right turn signal lamps. These lamps are disposed so that they overlap a respective arrowhead and a portion of the cut away central portion, as best shown in Figure 3.

A substantially M-shaped reflector 39 is supported within the enclosure of the U-shaped signal box, the ends of the reflector bearing upon the front wall of the signal box and the bight or center V-shaped portion of the reflector being disposed at substantially the middle of the central cut away portion 32, as best shown in Figure 3. The reflector is orificed, as shown at 40, to receive the sockets of the signal lamps. A pair of set pins 41 are permanently secured to the plate 35 and the M-shaped reflector is slid over the signal lamps and set pins, the set pins preventing the reflection from wobbling. The rim 43 holds the signal box firmly in place.

A pair of shades 42 extend from the vertical wall of the signal box at the wide ends of the cut out arrowheads of the signal box and these shades, as best shown in Figure 3, are disposed to extend rearwardly in the M-shaped reflector to nearly the signal lamps 22 and 24. The V-shaped central portion of the reflector extends substantially to a plane in which the rear edges of the reflector are located. Consequently, when, for example, the left turn signal lamp is energized it will illuminate only the arrowhead 34 and the central cut away portion 32 so that a complete arrow pointing to the left will be illuminated. When the right turn signal lamp 24 is energized it will illuminate the only cut out arrowhead 33 and the central cut out portion 32 thereby illuminating a complete arrow pointing toward the right to indicate the driver's intention.

By referring more particularly to Figure 1 it will be seen that the lamp casing is closed by a lens rim 43 having parallel division bars 44 dividing the rim into an upper substantially semi-circular section which is closed with a red pane 45, a lower substantially semi-circular section which is closed by a red pane 46, and an oblong central section with rounded ends which is closed by an amber pane 47. The amber pane exposes the cut away portions 32, 33 and 34 so that when either of the signal lamps is selectively energized an amber arrow will appear to indicate the driver's intention. The red panes 45 and 46 are conventional panes through which the stop and tail lights shine. As shown in Figure 1, a transparent pane 48 is disposed in the bottom of the lamp casing through which the tail light shines to illuminate the license plate 14.

What is claimed is:

1. A signal lamp for motor vehicles, comprising a lamp casing, a U-shaped signal box in the casing, a tail lamp in the casing below the box, a stop lamp in the casing above the box, there being a light slot in the vertical wall of the box terminating at each end in a direction indicating arrowhead, an M-shaped reflector forming a closure for the box, a pair of lamps in the reflector, each lamp respectively overlapping an arrowhead and a portion of the slot adjacent to the arrowhead, and shades extending from the vertical wall of the box at the wide ends of the arrowheads toward the lamps, the center portion of the M-shaped reflector extending to approximately a plane in which the rear edges of the shades are located whereby to permit each lamp to illuminate the slots and only one of the arrowheads.

2. A signal lamp for motor vehicles, comprising a lamp casing, a transparent lens having upper and lower colored portions and an intermediate colored portion of a contrasting color, a signal box in the casing having a vertical wall provided with a cut out slot registering with the intermediate portion of the lens and terminating at the ends in direction indicating arrowheads, an M-shaped reflector forming a closure for the box, a pair of signal lamps, each signal lamp respectively overlapping an arrowhead and a portion of the slot adjacent the arrowhead, shades extending from the rear wall of the box at the wide ends of the arrowheads toward the lamps, the center portion of the M-shaped reflector extending to a plane in which the rear edges of the shades are located to permit each lamp to illuminate the slot and only one of the arrowheads, a stop lamp in the casing above the box registering with the upper portion of the lens, and a tail lamp in the casing below the box registering with the lower portion of the lens.

3. A signal lamp for motor vehicles comprising a lamp casing, a supporting plate in the casing, superposed tail and stop lamps on the plate, signal lamps on the plate, a U-shaped signal box in the casing housing the signal lamps, an M-shaped reflector integral with and forming a closure for the box, means securing the reflector to the plate between the superposed lamps, there being a light slot in the vertical wall of the box terminating at each end in a direction indicating arrowhead, and shades extending from the vertical wall of the box at the wide ends of the arrowheads toward the lamps, the center portion of the M-shaped reflector extending to approximately a plane in which the rear edges of the shades are located whereby to permit each signal lamp to illuminate the slot and only one of the arrowheads.

CONSTANTINE A. BRAUN.